United States Patent
McNeel et al.

[11] Patent Number: 5,475,652
[45] Date of Patent: Dec. 12, 1995

[54] DUAL GIMBAL GEOPHONE

[75] Inventors: William O. McNeel, Houston; Joe N. Wood, Sugar Land, both of Tex.

[73] Assignee: I/O Exploration Products, Stafford, Tex.

[21] Appl. No.: 85,502

[22] Filed: Jun. 30, 1993

[51] Int. Cl.$^6$ .................. G01V 1/16; H04R 9/00
[52] U.S. Cl. ................. 367/188; 181/122; 73/649
[58] Field of Search ................. 367/178, 179, 367/182–188; 181/122; 73/649

[56] References Cited

U.S. PATENT DOCUMENTS

| | | | |
|---|---|---|---|
| 4,525,819 | 6/1985 | Hefer | 367/188 |
| 4,686,771 | 8/1987 | Beveventano et al. | 33/324 |
| 4,893,290 | 1/1990 | McNeel et al. | 367/178 |
| 4,897,824 | 1/1990 | Stokes | 367/179 |
| 4,935,883 | 6/1990 | Hulsing | 73/382 G |
| 5,142,497 | 8/1992 | Warrow | 367/173 |

*Primary Examiner*—Nelson Moskowitz
*Attorney, Agent, or Firm*—Haynes and Boone

[57] ABSTRACT

This invention provides a dual gimbal geophone assembly. The geophone is placed in the cavity of a mass member. The mass member is rotatably attached to a frame so that the mass member rotates about a first plane. The frame is rotatably attached to support members so that the frame rotates about a second plane which is orthogonal to the first plane. This geophone provides two degrees of rotation, one along the first plane and the second along the second orthogonal plane. The geophone remains vertical within the tilt tolerance of the geophone regardless of the orientation of the assembly.

15 Claims, 2 Drawing Sheets

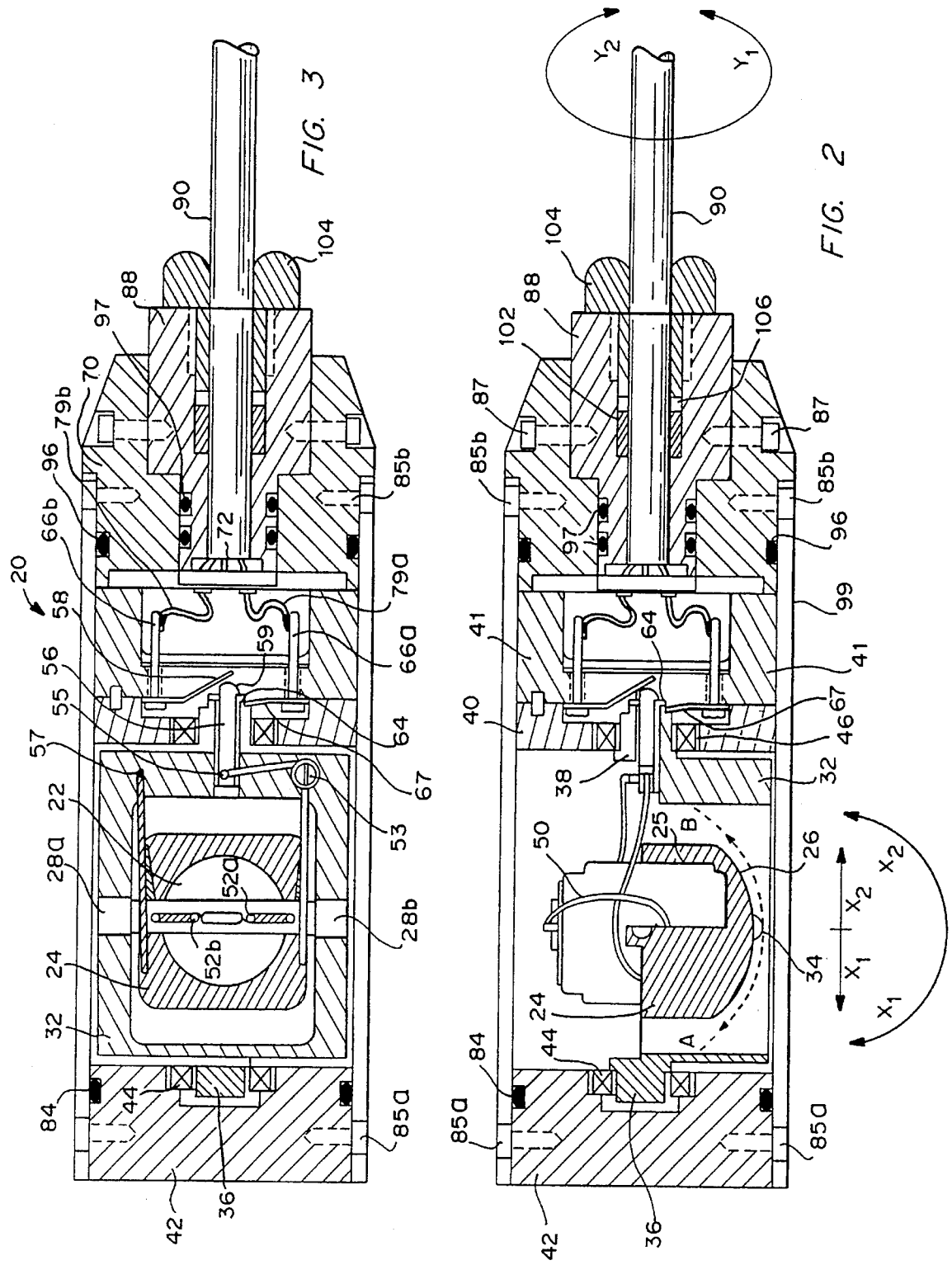

DUAL GIMBAL GEOPHONE

BACKGROUND OF THE INVENTION

1. Field of the Invention

This invention relates generally to seismic sensors and more particularly to a gimbal geophone.

2. Description of the Related Art

In seismic exploration, a seismic source is used to introduce a seismic signal into the earth. The seismic signal propagates through the earth in the form of a spherical wave front. As the wavefront impinges upon the substrata layers (structural changes), a portion of the wave front is reflected back to the earth's surface. The reflected waves are recorded by a plurality of sensors and the recorded data is processed to obtain information about the earth's subsurface. In seismic exploration on land, shallow water and marsh lands, geophones are typically used as sensors.

Geophones are accelerometers, in that they contain a suspended mass and are designed to detect the movement of such mass. Such geophones require vertical or near vertical placement (orientation) for optimal results. Geophone manufacturers specify a maximum tilt angle (typically about 30°–35°) above which the geophone provides no useful information. In land surveys, geophones are implanted into the earth so that they remain near vertical during seismic survey. For shallow waters or marsh lands, gimbal geophones have been designed which provide a single degree of rotation or freedom. The geophone is placed in a sealed housing wherein it can rotate about a longitudinal or center axis. A plurality of such gimbal geophones are attached to a cable, commonly referred to in the art as the "bay cable." The bay cable is placed along a desired pattern on the earth's surface. The earth's surface, however, may have a slope greater than the maximum tilt angle of the geophone or there may be under water obstacles, such as reefs, man-made objects and the like. In such cases, the geophones may get placed with a tilt angle greater than the maximum tilt angle of the geophone, which is highly undesirable. Some geophone manufacturers provide separate geophones for use in horizontal and vertical configurations. This is highly undesirable because it requires the surveyor to know configuration of the earth's surface under water or marsh and configure the cable with different types of geophone. Also, it requires maintaining inventory of two types of geophones, which increases the operational cost and is thus undesirable.

It is therefore highly desirable to have a geophone which is (a) completely orientation-insensitive, i.e., insensitive in all directions within the tilt tolerance of the geophone, (b) relatively easy to manufacture and (c) does not cost substantially more than the currently available one direction gimbal geophones.

The present invention addresses the above-noted problems and provides a gimbal geophone which is completely orientation-insensitive.

SUMMARY OF THE INVENTION

The present invention provides a dual gimbal geophone which is orientation insensitive. The geophone is placed in a body or cradle. The cradle is gimbaled within a frame so that the cradle may rotate within the frame about a first axis. The frame is placed in end caps so that the frame may rotate about a second axis which is orthogonal to the first axis. Electrical conduction paths are provided from the geophone to a cable via the frame.

The method of the present invention includes the steps of: placing a geophone in a body; placing the body in a frame in a manner which enables the body to rotate about a first plane; placing the frame in an outer member in a manner which enables the frame to rotate about a second plane that is orthogonal to the first plane; and providing electrical connections from the geophone to a cable.

Examples of the more important features of the invention thus have been summarized rather broadly in order that detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which the like elements have been given like numerals and wherein:

FIG. 2 shows a sectional elevation view of the geophone of the present invention.

FIG. 3 shows a sectional plane view of the geophone of the present invention.

DETAILED DESCRIPTION OF THE PREFERRED EMBODIMENT

Figure 1:
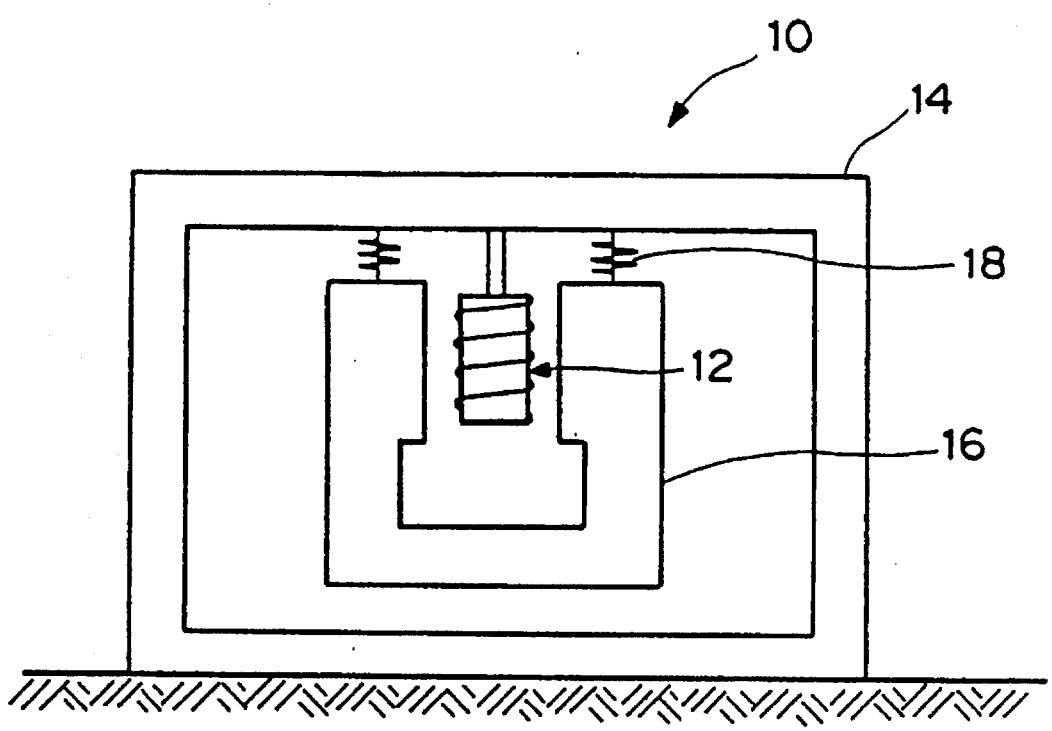
FIG. 1 shows a schematic diagram of a typical geophone.

The present invention provides a gimbal geophone that is orientation-insensitive. The term "orientation insensitive" and its variations are used herein to mean that the geophone will attain a vertical position within the tilt tolerance of the geophone regardless of the orientation of the gimbal geophone itself. The gimbal geophone of the present invention contains a geophone placed in a cradle or body, which is rotatably placed about a first axis in a frame. The frame is placed between two end members or caps and is rotatable along a second axis which is orthogonal to the first axis. The end members are sealingly placed in an outer housing. The space between the outer housing and the end members is partially filled with a nonconductive lubricant. Means are provided which partially restrict the motion of the body, i.e., prevent it from rotating completely about the first axis. Electrical conduction paths between the geophone and a cable coupled to the outside end of one of the end caps are provided via the frame for carrying signals from the geophone to the cable.

To understand the usefulness of the present invention, it is considered helpful to first briefly describe the operation of a typical commercially available geophone. Such a geophone is schematically shown in FIG. 1. The geophone 10 contains a coil 12 which is fixed to the top of an enclosed cylindrical housing 14. A U-shaped magnet 16 is suspended from the top of the housing 14 so that the coil 12 is centered about the magnet 16. The housing 14 is placed on the earth's surface so that the geophone will move along with the earth in response to seismic disturbances. The relative motion between the coil and the magnet produces an electromotive force between the coil 12 and the magnet 16, which produces an electrical voltage that is proportional to the velocity of the motion. Alternatively, the magnet may be fixed to the housing 14 and the coil 12 may be suspended. In either case, the gap between the coil and the magnet is relatively small and the strength of the signal is at its peak when the coil is centered about the magnet, i.e, the geophone is placed vertical relative to the earth even though the geophone can provide adequate signal when it is tilted within the tilt tolerance of the geophone.

As noted earlier, in shallow water and marsh covered lands, geophones are placed on the earth's surface and the topography of the surface dictates the orientation of the geophones. Therefore, it is highly desirable to have a geophone which remains vertical within the tilt angle of the geophone regardless of the orientation or placement of the assembly on the earth's surface.

FIG. 2 shows a cross-sectional elevation view of a gimbal geophone 20 according to the present invention. FIG. 3 shows a cross-sectional plan view of the gimbal geophone of FIG. 2. The structure of the gimbal geophone of the present invention will now be described while referring to FIGS. 2 and 3.

A geophone 22 is fixedly placed in the cavity 25 of a body 24. A separate pin 28a and 28b is placed on the opposite sides of the body 24. The pins are aligned with each other. The body 24 is placed in a frame 32 about the pins 28a and 28b so that the body pivots about these pins and is able to freely rotate about these pins in a first direction denoted by X1-X2. If the frame 32 is held fixed, the body 24 and thus, the geophone 22, will rotate about the axis of the pins 28a and 28b.

The body 24 is made sufficiently heavy and its bottom end 26 is made semispherical or given some other desired shape so that the body 24 will rotate under gravitational pull to ensure that the sensitive axis of the geophone 22 is always orthogonal within the tilt angle of the geophone relative to the earth's surface. The body 24 has a pin or protrusion 34 at its bottom end. When the body 24 rotates in the X1 direction, the pin 34 prevents it from rotating beyond a predetermined point A. Similarly, when the body 24 rotates in the X2 direction, the pin 34 hits the inside of the frame 32 at a predetermined point B and prevents it from rotating any further.

The frame 32 contains a first gimbal end 36 and a second gimbal end 38. The ends 36 and 38 protrude outward from the frame 32 and are aligned in the opposite direction (orthogonal) from the axis of the pins 28a and 28b of the body 24. The end 36 is placed in an opening 44 in a first end member or a first end cap 42. Ball bearings or some other desired means may be provided in the cavity to facilitate free rotation of the end 36 in the cavity 42. Similarly, the end 38 is rotatably placed in an opening 46 of a second end member or a second end cap 40 having ball bearings or some other desired means. In this manner, the frame 32 will freely rotate about the ends 36 and 38 and about the rotational axis shown by Y1-Y2. The above construction provides two degrees of rotation or freedom for the geophone 22: one about the ends 36 and 38 of the frame 32 in the Y1-Y2 plane and the second about the pins 28a and 28b in a plane X1-X2 orthogonal to the Y1-Y2 plane.

Typically, a geophone such as geophone 22, has two output terminals and requires electrical conduction paths from the geophone to a cable, such as cable 90, to transmit signals from the geophone to the recording instrumentation (not shown). In the preferred embodiment, shown in FIGS. 2 and 3, an electrical wire 50 is connected from a first terminal 52a on the geophone 22 to a point 53 on the frame. The point 53 is electrically insulated from the frame 32. The point 53 is electrically connected to an end 55 of a conduction path 56 formed within and through the length of the end 38 of the frame. The end 58 of the conduction path 56 protrudes beyond the end 38 so that an electrical connection may be made thereto. The conduction path 56 is electrically insulated from the frame 32. The wire 50 is looped around the end 28b between the body 24 and the frame 32 to avoid tangling of the wire when the body 24 rotates about the first axis. Likewise, the second terminal 52b is connected via a conductor 54 to the frame, which is made from a conductive material. The electrical wire 54 is looped around the end 28a between the body 24 and the frame 32 and is electrically coupled to the frame 32 at 57. The frame 32 is made from a conductive material and is used as a conductive path.

A spring type contact between a contact element 59 and the terminal end 58 is provided so that the spring contact element 59 continuously urges against the end 58 of the conduction path 56, while a terminal end 66b remains stationary. Similarly, a second spring type contact having a spring contact element 67 urges against a rotating end of the frame end 38 while the terminal end 66a remains stationary.

A geophone cap 41 is placed against the member 40. A top cap 70 is placed against the geophone cap 41. A cable 90 having a plurality of conductors terminates at a connector 72 placed on one end of the top cap 70. Conductors 79a and 79b respectively provide electrical contacts from the terminal ends 66a and 66b to the cable 90. A cable water block 88 is placed in the top cap 70. The cable is sealed at the top cap by compression screw 104 and a grommet 102 and a spacer 106. Top cap 70 and water block 88 are held in place by screw means 87.

The above-described assembly is placed inside an outer housing 99 which is typically made from a non-corrosive material, such as stainless steel. Seals, such as O-ring seals 84 and 96, are respectively placed between the outer housing 99 and the members 42 and 70. Additional O-ring seals 97 are placed to provide seal between the top cap 70 and the water block 88. The outer housing is affixed to the end cap 42 and the top cap 70 by set screws 85a and 85b or by any other desired means.

The above described structure provides a sealed geophone assembly wherein the geophone remains operationally vertical, i.e., within the tilt angle of the geophone, regardless of the orientation of the geophone assembly 20. As noted earlier, the pin 34 is provided to prevent the rotation of the geophone beyond points A and B so that the conductors 50 and 54 will not tangle. The rotation of the body 24 between the points A and B is made sufficient so that when the geophone assembly is in a vertical position, i.e, the center axis is vertical, the geophone 22 will be well within the tilt angle of the geophone. In most cases, rotating the geophone more than 60° is sufficient. It will, however, be noted that electrical connections from the geophones to the frame may be provided internally through the ends 28a and 28b respectively, thereby avoiding the need for conductors 50 and 54. In such a case, there will be no need to inhibit the rotation of the body in the X1-X2 direction, i.e. in the first direction or plane. In such a case, the geophone will rotate freely in two directions. The preferred embodiment uses wires because such a construction is inexpensive and provides geophone rotation which is sufficient to ensure that the geophone 22 will rotate more than what is required for commercially available geophones.

The foregoing description is directed to a particular method of the invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. An apparatus for use in geophysical prospecting, comprising:

an housing having first and second ends and having a longitudinal axis;

a first end cap coupled to said housing substantially near said first end of said housing;

a second end cap coupled to said housing substantially near said second end of said housing;

a frame having first and second gimbal ends on opposite sides of said frame, said first gimbal end rotatably coupled to said first end cap, said second gimbal end rotatably coupled to said second end cap, said gimbal ends aligned to define a first pivot axis parallel to said longitudinal axis of said housing, and said frame having a center of gravity substantially offset from said first pivot axis of said frame;

a body having a cavity, said body having two pins on opposite sides of said body, said pins rotatably coupled to said frame, said pins aligned to define a second pivot axis perpendicular to said first pivot axis, and said body having a center of gravity substantially offset from said first and second pivot axes;

a geophone disposed within said cavity of said body; and a substantially nonconductive lubricant partially filling the housing.

2. The apparatus of claim 1, further comprising:

means for operatively coupling said geophone to recording instrumentation.

3. The apparatus of claim 2, wherein said means for operably coupling comprises a plurality of conductors operably coupling said geophone to said recording instrumentation.

4. The apparatus of claim 3, wherein at least one of said conductors are looped around at least one of said pins between said body and said frame to permit rotation of said body about said second pivot axis without breaking or tangling said conductors.

5. The apparatus of claim 4, further comprising:

a mechanical stop to prevent complete rotation of said body about said second pivot axis of said body.

6. The apparatus of claim 2, wherein said means for operably coupling comprises:

at least two slip-ring conductors integral with said second pivot axis of said body;

a plurality of conductors operably coupling said geophone to said slip-ring conductors; and a plurality of conductors operably coupling said slip-ring conductors to said recording instrumentation.

7. An apparatus for use in geophysical prospecting, comprising:

an housing having first and second ends;

a first end cap coupled to said housing substantially near said first end of said housing;

a second end cap coupled to said housing substantially near said second end of said housing;

a frame made of conductive material, said frame having first and second gimbal ends on opposite sides of said frame, said first gimbal end rotatably coupled to said first end cap, said second gimbal end rotatably coupled to said second end cap, and said gimbal ends aligned to define a first pivot axis;

a body having a cavity, said body having two pins on opposite ends of said body, said pins rotatably coupled to said frame, and said pins aligned to define a second pivot axis perpendicular to said first pivot axis;

a geophone disposed within said cavity of said body; and a substantially nonconductive lubricant partially filling the housing.

8. The apparatus of claim 7 further comprising:

means for operatively coupling said geophone to recording instrumentation.

9. The apparatus of claim 8, wherein said means for operably coupling comprises a plurality of conductors operably coupling said geophone to said recording instrumentation.

10. The apparatus of claim 9, wherein at least one of said conductors is attached to said frame.

11. The apparatus of claim 10, further comprising:

an insulated conductive path within and through said second gimbal end of said frame.

12. The apparatus of claim 11, wherein at least one of said conductors is attached to said insulated conductive path within said second gimbal end.

13. The apparatus of claim 12, wherein at least one of said conductors are looped around at least one of said pins between said body and said frame to permit rotation of said body about said second pivot axis without breaking or tangling said conductors.

14. The apparatus of claim 13, further comprising:

a mechanical stop to prevent complete rotation of said body about said second pivot axis of said body.

15. The apparatus of claim 14, wherein said frame has a center of gravity substantially below said first pivot axis of said frame and said body has a center of gravity substantially below said first and second pivot axes.

* * * * *